(12) United States Patent
Chapelle

(10) Patent No.: US 11,899,751 B2
(45) Date of Patent: Feb. 13, 2024

(54) METHOD FOR TRAINING A MACHINE ABLE TO DETERMINE CHARACTERISTICS OF PLANT ELEMENTS

(71) Applicant: Pierre Chapelle, Saint Valery en Caux (FR)

(72) Inventor: Pierre Chapelle, Saint Valery en Caux (FR)

(73) Assignee: Inarix, Paris (FR)

( * ) Notice: Subject to any disclaimer, the term of this patent is extended or adjusted under 35 U.S.C. 154(b) by 450 days.

(21) Appl. No.: 17/293,323

(22) PCT Filed: Nov. 11, 2019

(86) PCT No.: PCT/FR2019/052690
§ 371 (c)(1),
(2) Date: May 12, 2021

(87) PCT Pub. No.: WO2020/099778
PCT Pub. Date: May 22, 2020

(65) Prior Publication Data
US 2022/0012545 A1    Jan. 13, 2022

(30) Foreign Application Priority Data

Nov. 13, 2018 (FR) ........................................ 1871503

(51) Int. Cl.
*G06F 18/214* (2023.01)
*G06N 3/04* (2023.01)
(Continued)

(52) U.S. Cl.
CPC ...... *G06F 18/214* (2023.01); *G06F 18/23213* (2023.01); *G06F 18/2411* (2023.01);
(Continued)

(58) Field of Classification Search
CPC .. G06V 10/143; G06V 10/454; G06V 10/764; G06V 10/82; G06V 20/60;
(Continued)

(56) References Cited

U.S. PATENT DOCUMENTS 5,321,764 A  6/1994 Cullen et al.
2022/0051074 A1* 2/2022 Lin .................... G06N 3/082

OTHER PUBLICATIONS

Yang Shuqin et al., "Predicting wheat kernel's protein content by near infrared hyperspectral imaging" International Journal of Agricultural and Biological Engineering, vol. 9, No. 2, Mar. 1, 2016, pp. 163-170.
(Continued)

*Primary Examiner* — Edward F Urban
*Assistant Examiner* — Wassim Mahrouka
(74) *Attorney, Agent, or Firm* — Blank Rome LLP

(57) ABSTRACT

A method for training an automatic learning machine (3.12), comprising the following steps:
defining, in a database, at least one first class of image matrices (3.11) and one second class of image matrices (3.11), the first class of image matrices being associated with said first measured characteristic value;
the second class of image matrices (3.11) being associated with said second measured characteristic value;
classifying said image matrices in said classes as a function of the respective measured characteristic value for the mixture of plant elements from which each of said images has been obtained;
modifying, by said calculator (3.15), in response to the reception of said overall classification error (3.18), at least one of its calculation elements, so that the second probabilities of inclusion of the image matrices in said at least two classes are closer to the true inclusion of the at least three image matrices in the at least two classes than the first inclusion probabilities.

12 Claims, 4 Drawing Sheets

(51) Int. Cl.
  *G06F 18/2411*  (2023.01)
  *G06F 18/2431*  (2023.01)
  *G06F 18/23213* (2023.01)
  *G06V 20/68*    (2022.01)
(52) U.S. Cl.
  CPC .......... *G06F 18/2431* (2023.01); *G06N 3/04* (2013.01); *G06V 20/68* (2022.01)
(58) Field of Classification Search
  CPC . G06V 20/68; G06F 18/214; G06F 18/23213; G06F 18/2411; G06F 18/2431; G06N 3/04
  See application file for complete search history.

(56) References Cited

OTHER PUBLICATIONS

Nicola Caporaso et al, "Protein content prediction in single wheat kernels using hyperspectral imaging", Food Chemistry, NL, vol. 240, Jul. 12, 2017, pp. 32-42.

Singh Simranjeet et al., "A Survey on Image Processing Techniques for Seeds Classification", 2018 4th International Conference on Computing Sciences (ICCS), IEEE, Aug. 30, 2018, pp. 143-150.

\* cited by examiner

[Fig. 1]
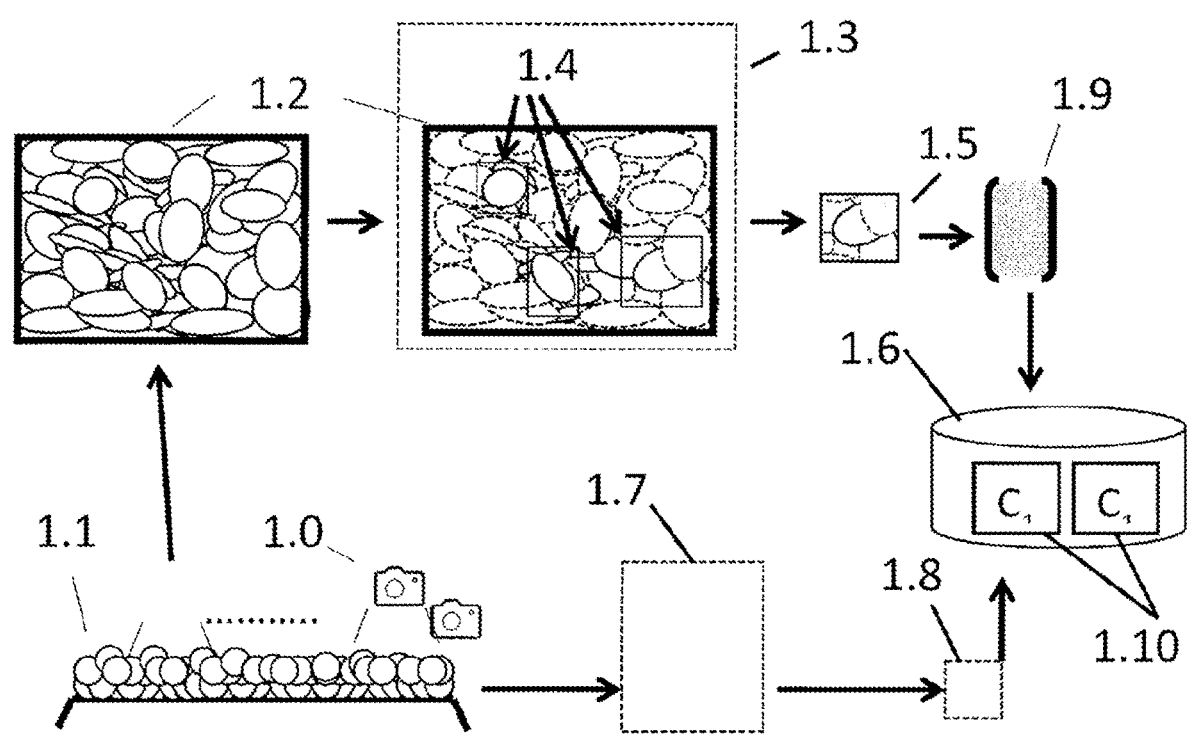

[Fig. 2]
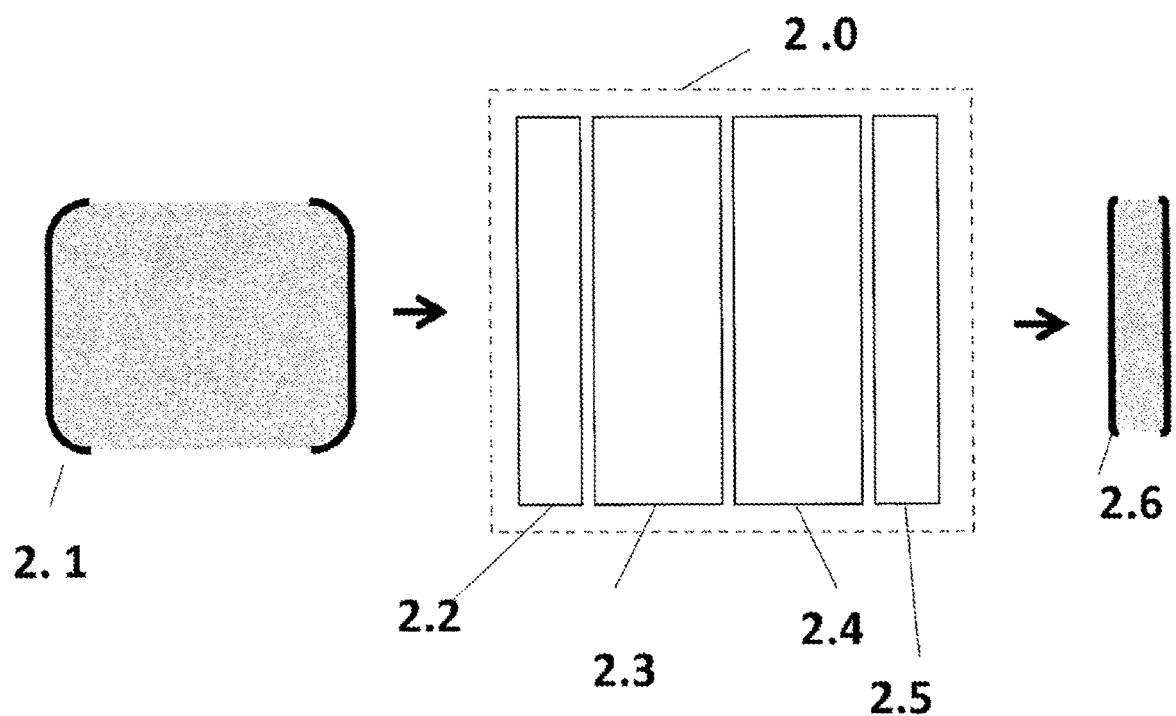

[Fig. 3]
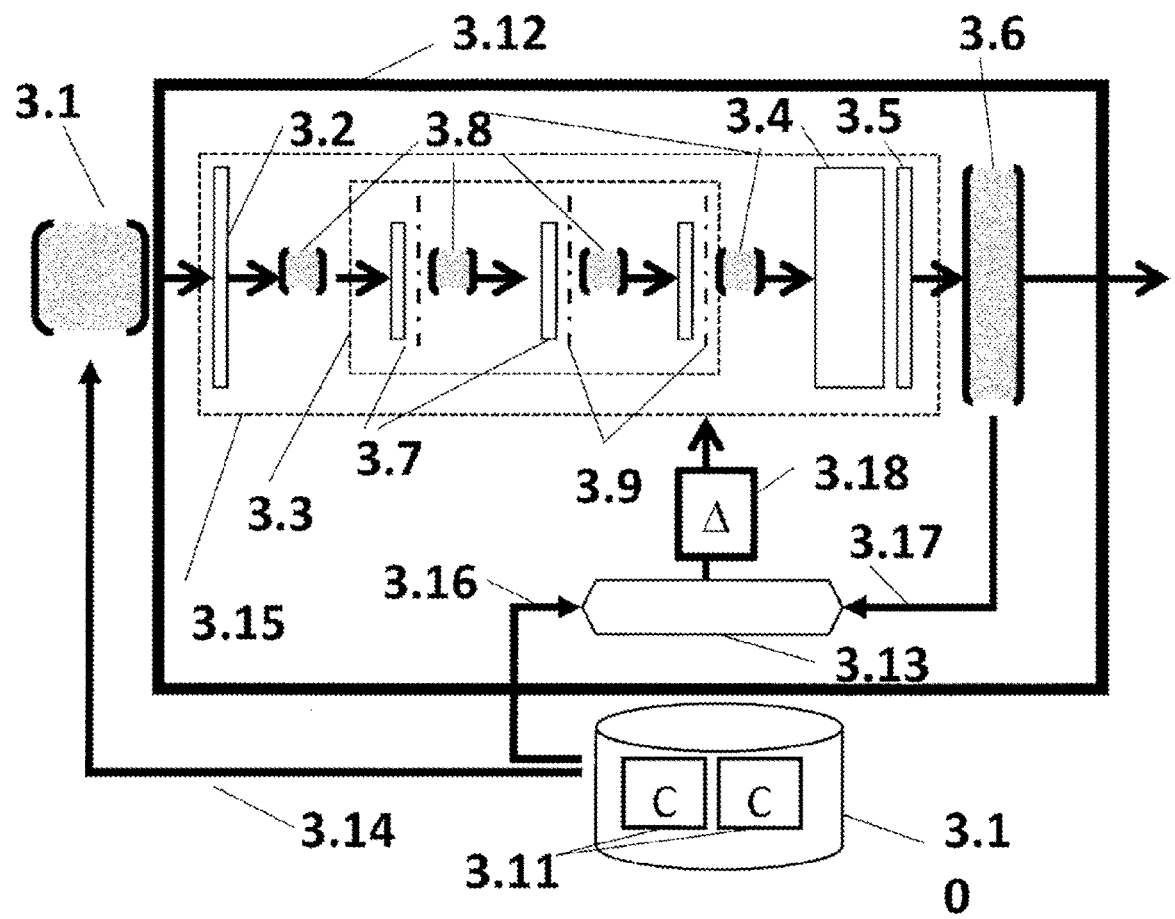

[Fig. 4]
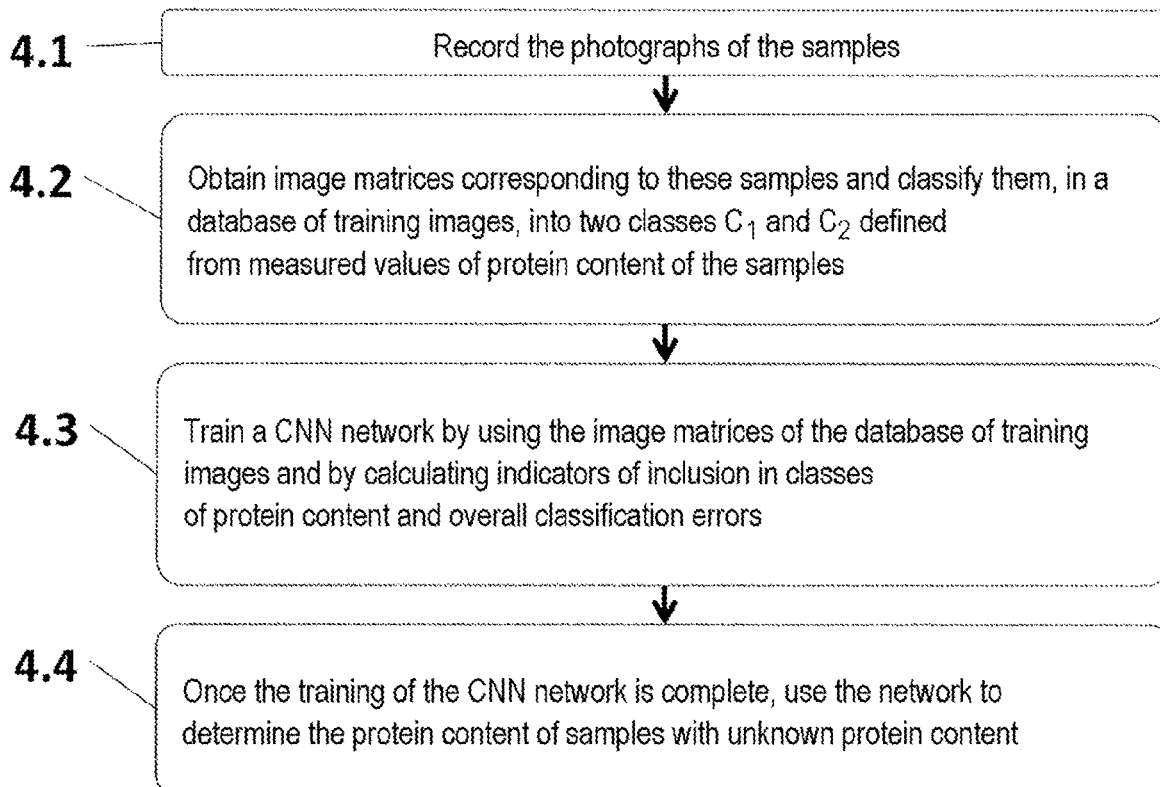

METHOD FOR TRAINING A MACHINE ABLE TO DETERMINE CHARACTERISTICS OF PLANT ELEMENTS

CROSS-REFERENCE TO RELATED APPLICATIONS

This application is a U.S. national stage application based on International Application No. PCT/FR2019/052690 filed Nov. 12, 2019, which claims priority to French Application No. 1871503, filed Nov. 13, 2018, both of which are herein incorporated by reference in their entirety.

FIELD OF THE INVENTION

The invention relates to the field of determining characteristics of plant elements.

BACKGROUND OF THE INVENTION

Plants grow either naturally or by being cultivated by human beings. These plants are often in the form of plant elements such as grains, seeds, stems, flowers or other basic forms. Thus, the agricultural industry produces numerous cereals providing plant elements such as wheat grains, corn grains, with each of these categories generally comprising several varieties. These plant elements are often used in the food chain. For example, wheat cultivation provides wheat grains that are crushed in order to obtain flour that is used to produce, depending on its compositional characteristics, bread for human food or feeds for animal food. The choice between these two applications particularly depends on the protein content of this wheat flour. For its part, apple harvesting provides batches of apples that often contain different varieties of apples: reinette, golden, etc. Hereafter, the example of wheat grains will be used most often.

The protein content of a batch of wheat flour is generally measured on a sample representing wheat grains sampled from the batch, with this sample therefore being made up of a mixture of wheat grains. The average protein content of the sample can be measured directly, either using a chemical method, called Kjeldahl method, or using a physical method, by combustion, called Dumas method. The average protein content of the sample also can be measured indirectly on a mixture of whole grains by spectrometry in the near infrared field, also called NIRS (Near Infra-Red Spectroscopy).

These three methods allow the amount of total nitrogenous matter N to be determined for the flour that is obtained from the studied batch. This amount is expressed on a dry matter basis. It is subsequently multiplied by a coefficient equal to 5.7 for wheat intended for human food and equal to 6.25 for wheat intended for animal food. The result that is obtained is compared to a threshold, which depends on the application. The quality of the mixture is thus deemed to be suitable either for human consumption or for animal consumption. The amount of wheat required for these three protein content measurements (Kjeldahl, Dumas, NIRS) typically is a few hundred grams of wheat grains or an equivalent volume that is approximately half a liter, depending on the density of the wheat grains.

Knowledge of the protein content of a wheat batch can have other applications. Thus, if several wheat fields have been treated with different fertilizers, the comparison of the average protein content of the wheat that is obtained can be used to qualify the performance of these fertilizers.

The three stated methods (Kjeldahl, Dumas and NIRS) have the disadvantage of high cost, since the samples made up of mixtures of wheat grains must be sent to specialist laboratories for assessment. It is to be noted, with respect to the NIRS method, that some prototypes have been developed in order to produce compact reflectometers allowing analysis on the sites for producing or transforming batches of grains. This is the case, for example, for portable LED infrared systems, such as SCiO by Consumerphysics. However, these appliances remain relatively expensive.

In U.S. Pat. No. 5,321,764, image analysis has been used to determine the variety of a mixture of wheat grains. The method uses a video camera and a computer for acquiring and processing images of wheat grains, in particular the images of the kernel and the germ. For each grain, these images are processed in a digital format, the corresponding data is stored in a computer, for subsequent comparison with an unknown wheat.

Therefore, a requirement exists for methods for analyzing mixtures of plant elements, such as mixtures of seeds of cereals, fruits or even of other plants. These analyses must be able to allow characteristics of these plant elements to be determined. These characteristics can be associated with their composition, for example, their protein content, an equivalence of the Hagberg falling number (standardized method for wheat grains), the moisture content, the level of mycotoxins or other types of characteristics of compositional characteristics.

These characteristics also can be associated with the amounts of different varieties of the same plant element contained in a plant mixture, for example, a mixture of different varieties of apples.

These analysis methods must have a lower cost and use information that is available on the production or transformation sites of the food chain, whilst providing reliable results.

A requirement also exists for a method for determining characteristics of plant elements with any type of appearance: that of grains, stems, flowers, or even other appearances. For example, the textile industry is interested in the characteristic of hemp stems or the cosmetics industry is interested in that of rose flowers.

A requirement also exists, at a time when ecological concerns are becoming essential, for methods that can be implemented in areas of natural plant growth. For example, a requirement exists for measuring the protein content of natural wheat grains, such that they can spontaneously grow in the wild. Therefore, a requirement exists for a method allowing the characteristic of plant elements originating from human activity to be determined, as considered, by way of an example, throughout the remainder of this description, but also for the plant elements that spontaneously grow in the wild, without human intervention.

The aim of the invention is to improve the situation by overcoming the disadvantages of the previously known solutions.

To this end, the invention proposes a method for training an automatic learning machine capable of determining characteristics of plant elements, comprising the following steps: recording a first sample photograph of a first sample made up of a first mixture of plant elements; recording a second sample photograph of a second sample made up of a second mixture of plant elements; obtaining, by means of image analysis software, a first image of an isolated plant element contained in said first sample photograph, said first image of an isolated plant element being represented by a first image matrix; obtaining, by means of said image analysis software, a second image of an isolated plant element contained in said second sample photograph, said second image of an isolated plant element being represented by a second image matrix; measuring a first measured characteristic value for said first sample and a second measured characteristic value for said second sample; obtaining, by means of said image analysis software, a third image of an isolated plant element contained in said first sample photograph, and a third corresponding image matrix; defining, in a database of the training images, a first class of image matrices associated with said first measured characteristic value and a second class of image matrices associated with said second measured characteristic value; classifying said first and third image matrices in said first class and said second image matrix in said second class; calculating, for each of said three image matrices, by means of a calculator, three first indicators of inclusion in said two classes; measuring, by means of a comparator, a first overall classification error, which is a function of said three first indicators of inclusion in said two classes and on values of measured characteristics defining the classes in which said three image matrices have been classified; modifying, by said calculator, in response to the reception of said first overall classification error, at least one of its calculation elements, for subsequently calculating three second indicators of inclusion in said two classes corresponding to said three image matrices.

Furthermore, this method can be repeated by means of additional samples, additional photographs of samples, of additional images of isolated plant elements and of additional image matrices.

The method according to the invention is such that said calculator can form part of the group comprising a convolutional neural network, a k-Nearestneighbors algorithm or a support vector machine algorithm.

In the event that said calculator is a convolutional neural network, said calculation element can be the synaptic weight of a neuron.

According to the proposed method, the sample can be a mixture of plant elements forming part of the group comprising a grain, a seed, a stem, a flower, a fruit.

The method also can be such that the plant elements form part of the group comprising cereals, coffee, cocoa, plant grains, plant seeds, mixtures of varieties or of species.

In the method according to the invention, said characteristic can form part of the group containing a value or a range of values of a composition of a plant element, or a variety of a plant element.

The method can be such that the characteristic sample value is obtained from a method forming part of the group comprising, on the one hand, for a compositional characteristic, the Kjeldahl method, the Dumas method or the near infra-red spectroscopy method or the "falling number" for the Hagberg falling number, and, on the other hand, for a variety characteristic, determining the predominant variety in the sample.

The method can be such that the measured characteristic forms part of a group containing the measurement of the protein content, the Hagberg falling number, the level of myxotoxins (deoxynivalenol, zearalenone, ochratoxine), the moisture content, the specific weight or a level of impurities.

The method according to the invention can implement measurements using ELISA kits or strip kits for measuring mycotoxins or a moisture meter (piezoelectric or infrared) for measuring moisture or a visual analysis for measuring the level of impurity or the "falling number" for the Hagberg falling number.

The method according to the invention can be such that the indicator for inclusion in the two classes forms part of the group comprising the indication of one from among said two classes or the indication of a probability of inclusion in either one of said two classes.

The method according to the invention can further comprise the steps involving recording a new sample photograph of a new sample made up of a new mixture of plant elements with an unknown characteristic, obtaining, by means of image analysis software, a new image of an isolated plant element contained in said new sample photograph, and a new corresponding image matrix, said calculator calculating an indicator of inclusion in said two classes for said new image matrix.

One idea behind the invention is to combine image analysis software and an automatic learning machine, with each having the following additional functions: the image analysis software is used to obtain image matrices, for example, corresponding to images of isolated wheat grains in an image of a mixture of wheat grains. The automatic learning machine is used to calculate a characteristic of this isolated plant element, for example, the protein content or the corresponding wheat grain variety.

The advantage determining this combination is to allow the automatic learning machine to learn from a reduced number of samples of mixtures of wheat grains. Indeed, it is known that an automatic learning machine must be pretrained using thousands of learning cases. One method could involve training an automatic learning machine to determine the composition of samples made up of mixtures of plant elements, for example, mixtures of wheat grains. The number of automatic learning cases then would be limited to the number of mixtures of wheat grains, the composition of which could have been determined otherwise, by means of one of the known methods (for example, Kjeldahl, Dumas or NIRS). If 1,000 automatic learning cases were necessary, 1,000 mixtures of wheat grains thus should be characterized as a composition.

By contrast, the invention proposes training the automatic learning machine from individual plant elements (for example, individual wheat grains), and not from mixtures. These individual plant elements are those for which the image analysis software has been able to provide an image of an isolated plant element from a photograph of the mixture to which it belongs. An important idea behind the invention is to assign the same fictitious composition to, for example, 100 individual plant elements (which can be 100 wheat grains), the images of which have been isolated in the same mixture by means of the image analysis software. This fictitious composition, which is the same for the 100 plant elements, is the average composition of the mixture to which these 100 plant elements belong. This composition of the mixture is easy to determine otherwise, as has been seen, by means of a known method (for example, Kjeldahl, Dumas or NIRS). The determination of the composition of 10 mixtures then provides 1,000 automatic learning cases (100 times more). Indeed, even if the same fictitious composition value is assigned to 100 individual plant elements originating from the same mixture, their images, which therefore will be called images of isolated plant elements herein, obtained by means of the image analysis software, are different, thus providing 1,000 different automatic learning cases for the automatic learning machine. Therefore, the invention has a considerable cost advantage.

BRIEF DESCRIPTION OF THE DRAWINGS

Further features and advantages of the invention will become apparent with reference to the following detailed description and the accompanying highly schematic drawings, in which:

FIG. 1 shows the steps for constructing the database of the training images of an automatic learning machine of the CNN type;

FIG. 2 shows an example of a calculator of an automatic learning machine, with this calculator comprising a CNN network receiving as input an image matrix of an isolated wheat grain and delivering as output an indicator of inclusion in classes of protein content for wheat grains;

FIG. 3 shows a highly summarized depiction of an automatic learning process of an automatic learning machine so that it is then capable of determining a characteristic of an individual plant element, on the basis of a corresponding image matrix;

FIG. 4 shows the steps of the method for training an automatic learning machine, then its use for determining the protein content of an unknown sample.

The accompanying drawings not only can be used to supplement the invention, but also to contribute to its definition, if applicable.

DETAILED DESCRIPTION

For the sake of simplicity, and unless otherwise stated, the embodiment of the invention that will be described throughout the remainder of this description relates to the measurement of the protein content of individual wheat grains based on knowledge of the protein content of mixtures of wheat grains, called samples herein. This choice nevertheless must not be considered to be a choice limiting the scope of the invention.

In the proposed embodiment, 62 batches of soft wheat, with generally different origins and therefore protein content, are shown by 62 corresponding samples, which are mixtures of wheat grains, with the volume of each sample being approximately 0.5 liters. For each sample, 30 different digital photographs are recorded. If the 30 photographs are considered to be associated with one sample, they still do not show the same grains of the sample, some grains appear several times and some other grains never appear. Indeed, the conditions for overlaying grains are different for each of the 30 digital photographs, for example, depending on the image capture angle or the lighting when the photograph was recorded, or by again mixing the grains of the mixture between two recordings of photographs. A total of 62×30, that is 1,860 digital photographs is therefore obtained for all the 62 samples.

FIG. 1 shows, at 1.1, a wheat sample arranged on a surface and the photographic recording, using a camera 1.0, of the 30 associated photographs. One of the 30 photographs is shown at 1.2, with this photograph only showing part of the sample 1.1. The photograph 1.2 that shows a plurality of wheat grains overlapping is also one photograph from among the 1,860 previously mentioned photographs. Image analysis software 1.3 is used to supply images of isolated wheat grains 1.5. To this end, the software 1.3 is capable of morphologically detecting elementary wheat grains appearing on the photograph 1.2, allowing small rectangular zones 1.4 to be isolated in said photograph, in which zones an elementary wheat grain is included. The image parts 1.4, which are considered independently of the complete image 1.2, are again shown at 1.5 in FIG. 1. The images 1.5 are more generally denoted in this description as being the images of isolated plant elements, provided by the software 1.3.

It is not necessary for the rectangular zones 1.4 to show a single wheat grain or even for this wheat grain to be completely visible. It is for this reason that, even if hereafter at 1.5 reference is made to images of isolated wheat grains, or more generally, to images of isolated plant elements, it also would have been possible to refer to images of pseudo-isolated wheat grains or images of pseudo-isolated plant elements. Therefore, it is important to note that, in the embodiment provided, the images of isolated grains 1.5 can be obtained without having to physically separate the wheat grains from the sample, which constitutes a cost advantage.

By way of an example, it will be considered hereafter that the software 1.3 for extracting images of isolated plant elements allows 18 images of isolated wheat grains to be obtained from each of the 1,860 photographs, that is a total of 33,480 images of isolated wheat grains 1.5.

The images 1.5 are digital photographs, having pixels, the intensity of which is quantified. For example, for a black-and-white image, the grayscales only relate to the integers ranging between 0 (black) and 255 (white). For a color image, for example, described according to the RGB model, the colors are determined by a triplet of grayscales (red: (255.0.0), green: (0.255.0) and blue: (0.0.255). The definition of the photograph corresponds to the height data multiplied by the width, expressed in pixels. It is usually expressed in megapixels, with 1 megapixel containing 1 million pixels. The resolution designates the number of pixels per unit of length of the analogue image. It allows the quality of the image obtained after digitization to be measured: the higher the resolution, the better the quality of the image. Other file formats currently exist for storing an image, such as, for example, the JPEG formats, with data losses, or the PNG and TIFF formats, without data losses. Other formats of two-dimensional images still exist or will emerge in the future. In an advantageous alternative embodiment of the invention, which will not be described herein, the images of isolated grains 1.5 could be three-dimensional images containing, for example, the information relating to the relief or the volume of the isolated wheat grains. The images also could be described in a space with 4 dimensions, 2 spatial dimensions and 2 spectral dimensions: indeed, a sample photograph 1.2 could be formed both by an image recorded in the visible spectrum and the same image recorded in a non-visible infrared spectrum, if the camera is provided with sensors for each of the two spectra. The image 1.2 also could be the photograph of a screen showing an image of a sample obtained by means of a scanning electron microscope. The photographs of samples 1.2 therefore can be obtained in a variety of spectral bands.

Each of these 33,480 images of isolated wheat grain 1.5 is recorded in the database 1.6 of the automatic training images, in the form of an image matrix 1.9, which will assist the learning of an automatic learning machine, as will be described hereafter. The image matrix 1.9 contains the characteristics of the image of an isolated wheat grain 1.5. Optionally, it can be necessary to format the image matrix 1.9 in order to make it compatible with a format that is accepted at the input of the automatic learning machine. This formatting can involve, for example, pre-processing of the image carrying out operations for normalizing the intensity of the pixels, for normalizing the spacing between pixels or for rescaling the image, or even other adaptations. In order to simplify the figures, these optional operations for formatting image matrices are not shown in FIG. 1, FIG. 2 and FIG. 3.

Once the 1,860 photographs 1.2 have been obtained as previously indicated, the average protein content of the 62 samples is determined at 1.7 using one of the previously stated methods, namely: the Dumas, Kjeldahl and NIRS methods. Therefore, for each sample 1.1, a measured value of its protein content is obtained, or more generally, a measurement of a characteristic of this sample is obtained. Therefore, in this example, the characteristic is a composition. Due to the implementation of the Dumas, Kjekdahl and NIRS methods, this sample composition is in fact an average composition of the individual plant elements that make up the measured sample. The values 1.8 are also recorded in the database 1.6 of the training images.

In the database 1.6 of the training images, the measured characteristic value 1.8 of the corresponding sample 1.1 is associated with each image matrix 1.9. Assigning a protein content value to an isolated wheat grain is a surprising approach for those seeking to determine the protein content of a sample made up of a mixture of wheat grains. Indeed, currently, the protein content of an individual wheat grain cannot be measured as such, since an individual wheat grain does not provide enough material for using one of the known methods, such as, for example, the Dumas, Kjeldahl and NIRS methods. Even if a method became possible one day, the operation would prove to be very expensive since thousands of measurements of protein contents would need to be taken, in fact, as many images of different isolated wheat grains 1.5 (33,480 in the example described) would be needed.

An important idea behind the invention is, by contrast, to associate a fictitious protein content with each of the 33,480 image matrices 1.9, which protein content is identical to the average protein content of the corresponding sample 1.1 that provided the considered isolated wheat grain image 1.5. This protein content is that which is measured at 1.7, and the result of which is provided at 1.8 for this sample 1.1. An essential advantage of this method according to the invention is that it only requires the 62 findings at 1.7 of the compositions of the 62 samples at 1.1.

The database of the training images therefore is created at 1.6, containing, on the one hand, the recording of 33,480 image matrices 1.9 and, on the other hand, the 33,480 fictitious protein contents that have been associated therewith. In the selected digital example, these 33,480 fictitious protein contents cannot each assume one of the 62 values of average protein content effectively measured on the 62 samples at 1.1. The database 1.6 of the automatic training images nevertheless does contain 33,480 cases of automatic learning, which are different for the vast majority, since, except by very rare chance, none of these cases generally have both the same photograph of an isolated wheat grain 1.5 and the same fictitious protein content of the corresponding individual wheat grain.

The protein contents as obtained at 1.8 assume values typically ranging between 7% and 15%. By way of a simplified example, throughout the remainder of this description it will be considered that the database of the training images that contain 33,480 image matrices 1.9 has been organized, by the user, into two classes 1.10: a first class, that will be called class $C_1$ hereafter, which corresponds to image matrices 1.9 associated with a plant element characteristic that in this case is a protein content 1.8 ranging between 7% and 12% inclusive; a second class, that will be called class $C_2$ hereafter, which corresponds to image matrices 1.9 associated with a plant element characteristic, which in this case is a protein content 1.8 ranging between 12% exclusive and 15%. Of course, the user of a method according to the invention can choose to organize the database of reference images into a greater number of classes, or to use a larger value range for the protein content, for example, from 0% to 20%. The plant element characteristic could be a characteristic other than the value of the protein content, as previously stated: for example, the value of the Hagberg falling number, that of the level of myxotoxins (deoxynivalenol, zearalenone, ochratoxine), that of the moisture content, or even the specific weight or a level of impurities. This plant element characteristic also could be a variety. In the case whereby the method according to the invention would be used to classify varieties, for example, varieties of apples, the fictitious characteristic associated with an image matrix 1.9 corresponding to an isolated image element 1.5, in this case an isolated apple image 1.5, could be the name of the dominant variety in the corresponding sample of apples 1.1. This dominant variety in the sample 1.1 can be determined in many ways: for example, by visual examination by an expert in the field, or by consulting the data describing the dominant variety that has been planted in the orchard from which the sample is taken.

With reference to FIGS. 2 and 3, and in a new step of a method according to the invention, an automatic learning machine is selected. An automatic learning machine is understood herein to refer to the ability of a machine to learn automatically, with this notion being known as machine learning. It involves, for example, computer programs that can change if exposed to new data. This science has been developed based on the theory whereby the computers can learn without being programmed to perform specific tasks.

In the proposed embodiment, the automatic learning machine contains a calculator. By way of a non-limiting illustration, the following calculators can be cited as examples of calculators: KNN (k-Nearest-Neighbors algorithm) calculators. The KNeighborsClassifier software from the scikit-learn python library is an example of a KNN machine. Other examples of calculators are Support Vector Machines (SVM). Other examples are also the neural networks that associate, in a relatively complex graph, elementary objects, often called formal neurons. Other examples of calculators exist.

By way of an example, an embodiment of the invention is provided herein using a calculator that is a neural network, called Convolutional Neurone Network (CNN), or even ConvNet. Throughout the remainder of the description, the term CNN networks will be used to denote them. Currently, an example of a CNN network is provided by the VGG16 machine, available in the "Keras" library, pre-trained on the "ImageNet" database.

The CNN networks allow an advantageous implementation of the invention, since they are particularly suitable for image analysis. The CNN network is selected so as to be able to begin its learning by means of the database 1.6 of the training images. The aim is, once the automatic learning phase has finished, to have made the CNN network capable of calculating an indicator of inclusion in a protein content class, for any new individual wheat grain, based on anew corresponding image matrix, presented to the CNN network as input. The result of this indication can be used in many ways. For example, by repeating the operation for several individual wheat grains originating from a new sample, an average value of their protein content can be calculated, thus allowing the new sample to be characterized. Other methods for exploiting the result provided by the trained CNN network can be implemented, for example, using a majority class vote.

The general aspects of the architectures and of the operation of the CNN networks are known and, for example, described in the "Deep Learning" publication by Ian Goofellow, Yoshua Bengio, and Aaron Courville, edited in 2016 by the Massachussetts Institute of Technology. Within the scope of this description the definition of the CNN networks will be used as it is provided in English on page 321 of this publication: "Convolutional networks are simply neural networks that use convolution in place of general matrix multiplication in at least one of their layers".

The CNN neural networks are acyclic artificial neural networks, in which the connection feature between the neurons is inspired by the visual cortex of animals. The neurons of this region of the brain are arranged so that they correspond to regions that overlap when tiling the visual field. Their operation is inspired by the biological processes. They are made up of a multilayer stack of perceptrons, the aim of which is to pre-process small amounts of information. Most of the CNN networks that are currently commercially available are inspired from the AlexNet network that was proposed in 2012.

The networks are formed by a succession of layers containing neurons that act as automatons provided with a transfer function that converts their inputs into outputs according to precise rules. For example, a neuron multiplies its inputs, determines the parity of the result, and responds by transmitting a signal that indicates this parity. These neurons are also associated with networks, for which the topology of the connections can assume numerous forms: proactive, recurrent networks, etc. The efficiency of the transmission of the signals from one neuron to another can depend on weight, this is referred to as "synaptic weight", these weights can be modified during the learning process of the CNN network.

The CNN networks that are currently commercially available are made up of dozens of layers. For the sake of clarity, all these layers will not be described in this description. FIG. 2 schematically shows the architecture of a CNN network at 2.0, which will be called calculator of the automatic learning machine herein. This calculator is made up of four blocks. An input block 2.2, a first learning block 2.3, a second learning block 2.4 and an output layer, also called classification layer, 2.5.

The learning block 2.3 is made up of numerous alternations of convolution sub-layers and of pooling sub-layers, not shown, but that are known to a person skilled in the art. The second learning block 2.4 is made up of a plurality of fully connected layers, it is connected to the classification layer 2.5, which delivers an indicator of inclusion in classes 2.6, for the image matrix 2.1. The image matrix 2.1 is that shown at 1.9 in FIG. 1. In the embodiment shown, the indicator of inclusion in classes 2.6 can be a vector (0.1, 0.9), the coordinates of which indicate, for the wheat grain corresponding to said image matrix 2.1, that there is a 10% chance that its protein content is within the range of values that allowed the class $C_1$ (from 7% to 12% exclusive) to be defined and a 90% chance that this protein content is within the range of values that allowed the class $C_2$ (from 12% inclusive to 15%) to be defined.

In a variant of the method according to the invention, the CNN can deliver, as an indicator of the protein content 2.6, a value of the protein content and no longer a probability vector.

In other alternative embodiments of the invention, the number of automatic learning classes can be greater than 2 and the plant element characteristic can be a moisture percentage or a variety or another characteristic, as previously stated.

The image matrix 2.1 presented at the input of the calculator 2.0 contains, as has been stated, all the information describing the image of an isolated wheat grain 1.5, for example, an image in JPEG format. This information is extracted from the learning database 1.6 and is presented to the input layer 2.2 of the calculator 2.0.

The learning block 2.3 contains filters that are used to find features in an image. The role of these features is shown in greater detail with reference to FIG. 3.

FIG. 3 again shows the image matrix 3.1 corresponding to the image of an isolated wheat grain 1.5, and previously denoted 1.9 or 2.1. The matrix 3.1 is extracted at 3.14 from the database 3.10 of training images. The automatic learning machine 3.12 contains the calculator 3.15, which is a CNN network made up of the input layer 3.2, of the two learning blocks 3.3 and 3.4, and of the classification layer 3.5, which delivers the indicator of inclusion in classes 3.6. In a more detailed manner than in FIG. 2, FIG. 3 shows sub-layers of neurons 3.7 of the learning block 3.3. Filters are also shown at 3.9 for identifying features. FIG. 3 also shows the database 3.10 of the training images, previously denoted 1.6, and a comparator 3.13.

A person skilled in the art knows that in a CNN network each sub layer 3.7 receives a data matrix 3.8, which it converts in order to deliver as output a new data matrix 3.8 as input for its following sub-layer 3.7. These successive data matrices 3.8, obtained from the image matrix 3.1, are therefore converted during their propagation from the input layer 3.2 to the classification layer 3.5. The data matrices 3.8 are therefore different to each other, with each being the result of a mathematical conversion of the preceding matrix by the effect of the corresponding sub-layer 3.7. For example, the first sub-layer 3.7 of the learning block 3.3 can provide as output a representation with 64 dimensions based on a representation with 3 dimensions for the image matrix 3.1.

As has been seen, in a CNN network, at least one of these mathematical operations is a convolution, irrespective of the characteristics of this convolution. A convolution can, for example, use a filter 3.9, which detects a feature in a data matrix 1.8. These features are forms of interest in each data matrix 3.8. These features are autonomously generated from calculations made by the CNN network, without any recourse to human intervention. A good feature, as is autonomously sought by the CNN network, must be unique enough to be able to differentiate two image matrices 3.1 to be associated with different classes of protein content, and must be generic enough to be able to easily recognize the images to be associated with the same class, despite their diversity in representations. These features are represented by small images, called templates and which will be described herein as a matrix. The task of the template matching, or feature recognition, is to recognize features in a data matrix 1.8 with a view to the classification of the image matrix 3.1. The recognition of features performed with filters can use the cross-correlation operator. This operator can convert a data matrix 3.8 into a new data matrix 3.8, which succeeds it in the propagation in the CNN network. Specifically, this operation involves sliding the data matrix 3.8 on the feature described by the filter 3.9.

It is important to note that before the neural networks are used, the task of finding the features of an image of an object that can be identified by a human being was entrusted to specialists in the field. Therefore, a zoologist was called upon to define the discriminating features of a "cat ear" according to the considered cat breeds. Similarly, a botanist was more competent for defining the discriminating features of "rose petals", according to the known varieties of roses. By contrast, the features identified by a CNN network are mathematical abstractions that do not correspond to any representation known by a human being. It is possible to imagine these features, which are detected by means of the filters 3.9, as informal mosaics autonomously calculated by the CNN network, at each of these sub-layers 3.7 of the learning block 3.3. These purely mathematical internal representations are called "deep features", with reference to the dozens of sub-layers of a CNN network. Different features are calculated by the CNN network, at each of the sub layers 3.7.

In a preferred embodiment, it is the CNN network itself that, during the training phase, generates the features sought by the filters 3.9. Based on a random selection of the initial features, these filters are progressively adapted by the CNN network as a function of the images contained in the database of the training images 3.10, according to a repeated process of tests and of corrections.

In an alternative embodiment of the invention, the CNN network can be used jointly with an algorithm that is known to a person skilled in the art, not shown in FIG. 3, for extracting features, such as, for example, an algorithm called "Scale-Invariant Feature Transform" (SIFT).

In an advantageous embodiment of the invention, the CNN network is a pre-trained commercial network, for example, of the VGG16, Inception, ResNet, or other type. These CNN networks contain deep learning algorithms pre-trained on standard databases. In effect, these CNN networks know how to reuse filters 3.9 in order to detect features previously extracted from all sorts of standard images, for example, objects or animals, in order to use them to classify image matrices of isolated wheat grains 3.1, in relation to classes of protein content. The automatic learning layer 3.3 of these CNN networks therefore already knows features previously identified in classification contexts different from that of the protein content of wheat grains. The 33,480 images of isolated wheat grains 1.5 are then used to retrain all or some of the sub-layers 3.7, to calculate together indicators of inclusion in classes 3.6 of protein content. This approach is described using the term "transfer learning".

The training of the automatic learning machine 3.12, in this case a CNN network, occurs as follows. The 33,480 image matrices are organized into groups of 100 image matrices. To clarify, the following particular example, which could have been different, is selected: the 100 first image matrices correspond to the first sample 1.1, the protein content of which, known at 1.8, has a value of 11.5%. These 100 first images are classified into the previously defined class $C_1$. The following 100 image matrices correspond to the second sample 1.1, the protein content of which is 12.5%, and are therefore placed in the previously defined class $C_2$. The following 100 image matrices again correspond to the first sample 1.1, and are therefore classified in class $C_1$. These 300 image matrices are successively presented to the input layer 3.2. For each matrix, the calculator 3.15 calculates an indicator of inclusion 3.6 in the previously defined classes $C_1$ and $C_2$. This involves a vector with two elements, with each element being a probability of classification in classes $C_1$ or $C_2$. For a given image matrix 3.1, the comparator 3.13 compares the class indication of the image matrix, which it receives at 3.16 from the learning database 3.10, to the indicator of inclusion in corresponding classes 3.6 that it receives at 3.17. Once this operation is repeated for these 300 first image matrices, the calculator 3.13 calculates an overall learning error 3.18.

The automatic learning machine 3.12 user can then command the overall classification error 3.18 to be delivered to the calculator 3.15, i.e. to the CNN network, which in response modifies the neural weights of links between its sub-layers 3.7. 300 second indicators of inclusion in classes of values are then re-calculated by the calculator 3.15 for the same 300 image matrices, as well as a second value of the overall classification error 3.18. If the tester considers that this second overall classification error is still too high, i.e. the classification indicators 3.6 are too far removed from the true inclusion of the 300 image matrices in classes $C_1$ and $C_2$, then the user can command the second overall classification error to be sent to the calculator 3.15, which again modifies the neural weights, then delivers 300 third indicators of inclusion in classes 3.6, and so on until the user is satisfied with the received indicators of inclusion in classes 3.6. The user then commands that 300 new image matrices 3.1 are presented to the automatic learning machine 3.12, and the previous process is repeated, until the 33,480 image matrices contained in the database 3.10 of training images are exhausted.

The overall classification error 3.18 obtained for a set of 300 image matrices in the considered example can be any function of the classification errors for each of these 300 images (average, standard deviation, etc.). The classification error of an individual image matrix has an expression that generally depends on the form used for the indicator of inclusion in classes 3.6. With reference, for example, to an image matrix that normally must be classified in class $C_2$, i.e. corresponding to a grain originating from a sample with protein content ranging between 12% exclusive and 15%. If the indicator of inclusion in classes 3.6 assumes the value (0.2, 0.8), then the perfect response would have been (0, 1), the classification error can be expressed as 0.2 on a scale of 0 to 1. It is possible for this error to be represented differently, for example, by defining a threshold: the error will be represented by 1 if it is greater than 10%, and by 0 if it is less than or equal to 10%. In the selected example, the indicator of inclusion in classes 3.6, with a value (0.2, 0.8), would result in the value "1", since the error on the considered image matrix is greater than 10%. The overall classification error 3.18 then can be defined as a function, for example, of the sum of the errors for each of the 300 image matrices. The automatic learning machine user can command calculation iterations by this machine based on these 300 images, until an overall classification error is obtained that is less than or equal to 3, meaning that for 99% of the image matrices, the classification error is less than 10%. Of course, it is possible to define many other ways of calculating the overall classification error 3.18.

The representation that has been provided in FIG. 3 can include numerous software or physical implementation variants. For example, the comparator 3.13 can be inside or outside the automatic learning machine 3.12. The database 3.10 of training images can be outside the automatic learning machine, as shown in FIG. 3, or can be integrated in this machine. It is also possible to consider that the comparator 3.13 is included in the calculator 3.15. Other groups or designations of these functional blocks are therefore possible for describing the automatic learning machine 3.12.

FIG. 4 shows summaries of the steps of a method according to the invention. Steps 4.1, 4.2 and 4.3 correspond to the training of the automatic learning machine. Step 4.4 corresponds to its use after training.

Step 4.1 corresponds to the recording of photographs 1.2 for the 62 samples that are distributed into two groups, as determined at 1.7 and 1.8: those for which the average protein content is less than or equal to 12%, and those for which the protein content is greater than 12%.

Step 4.2 involves obtaining, by virtue of the elements 1.2, 1.3, 1.4, 1.5 and 1.9, 33,480 image matrices on the basis of the 62 samples and classifying these image matrices into two classes $C_1$ and $C_2$, shown at 1.10 or 3.11, of a database, represented as 1.6 or 3.10, of the training images: the image matrices of class $C_1$ are those obtained from samples of protein content less than or equal to 12%. The image matrices of class $C_2$ are those obtained from samples of protein content of more than 12%.

Step 4.3 corresponds to obtaining indicators of inclusion in classes 3.6, allowing overall classification errors 3.18 to be calculated for an iteration of the calculation by the calculator 3.15 of the learning machine 3.12.

Step 4.4 involves, once the training of the CNN network is complete, using it to determine the protein content of samples, for which the protein content is unknown.

The sequence of the steps that has been shown with reference to FIGS. 1, 2 and 3 can be modified. For example, the measurement of the plant element characteristic 1.7 can be performed before or after the photographs 1.2 are recorded. Other sequences are therefore possible within the scope of the embodiment of the invention.

An advantage resulting from the invention is that its implementation is inexpensive. Firstly, as has been previously indicated, in the example of the measurement of the protein content of wheat, this is because the number of measurements (Kjekdahl, Dumas, NIRS) is reduced, since only a relatively limited number of samples of wheat grains needs to be analyzed. Secondly, this is because an imaging means as simple as the camera integrated in a mobile telephone can be used to record, on a production site or a nature study, photographs of mixtures of grains. An application for a mobile telephone can be developed to implement the communication between the mobile telephone that records the photographs of an unknown sample 1.1 and a remote automatic learning machine, which can return an indicator of inclusion in classes 3.6.

The embodiments that have been shown, as well as the means described to implement them, cannot be understood to be limitations to the scope of the claims as disclosed. The invention also is not limited to the embodiments of the previously described device or method, and which are only shown herein by way of an example of the implementation of the invention. The invention particularly encompasses all the alternative embodiments that can be contemplated by a person skilled in the art within the scope of the following claims.

The invention claimed is:

1. A method for training an automatic learning machine capable of determining characteristics of plant elements, comprising the following steps:
   recording a first sample photograph of a first sample made up of a first mixture of plant elements;
   recording a second sample photograph of a second sample made up of a second mixture of plant elements;
   measuring a first measured characteristic value WO for said first mixture of plant elements, and a second measured characteristic value for said second mixture of plant elements, with the second measured characteristic value being different from the first measured characteristic value,
   characterized in that it further comprises the following steps:
   obtaining, by means of image analysis software, a plurality of first images of a pseudo-isolated plant element, each first image of a pseudo-isolated plant element being contained in said first sample photograph and depicting totally or partially a plant element of said first sample, each said first image of a pseudo-isolated plant element being represented by a first image matrix;
   obtaining, by means of said image analysis software, a plurality of second images of a pseudo-isolated plant element, each second image of a pseudo-isolated plant element being contained in said second sample photograph and depicting totally or partially a plant element of said second sample, each said second image of a pseudo-isolated plant element being represented by a second image matrix;
   defining, in a database of the training images, at least one first class of image matrices and one second class of image matrices, the first class of image matrices being associated with said first measured characteristic value or with a range containing said first measured characteristic value; and
   the second class of image matrices being associated with said second measured characteristic value or with a range containing said second measured characteristic value;
   classifying said image matrices in said classes as a function of the respective measured characteristic value for the mixture of plant elements from which each of said images has been obtained, the step of classifying said image matrices comprising classifying said first image matrices in said first class and classifying said second image matrices in said second class;
   calculating, for each of said image matrices, by means of a calculator, a first indicator of inclusion in said at least two classes, said first inclusion indicator representing a first probability of inclusion of the image matrix in said at least two classes;
   measuring, by means of a comparator, an overall classification error, said overall classification error being dependent on classes in which said image matrices have been classified and on first inclusion probabilities; and
   modifying, by said calculator, in response to the reception of said overall classification error, at least one of its calculation elements, for subsequently calculating second indicators of inclusion in said at least two classes corresponding to said image matrices, said second inclusion indicators representing second probabilities of inclusion of the image matrices in said at least two classes, said at least one calculation element being modified so that the second inclusion probabilities of the image matrices in said at least two classes are closer to the true inclusion of said image matrices in the at least two classes than the first inclusion probabilities.

2. The method as claimed in claim 1, characterized in that the steps of this method are repeated by means of additional samples, of additional sample photographs, of additional images of isolated plant elements and of additional image matrices.

3. The method as claimed in claim 1, characterized in that said calculator forms part of the group comprising a convolutional neural network, a k-Nearest neighbors algorithm or a support vector machine algorithm.

4. The method as claimed in claim 1, characterized in that said calculator is a convolutional neural network and in that said calculation element is the synaptic weight of a neuron.

5. The method as claimed in claim 1, characterized in that said sample is a mixture of plant elements forming part of the group comprising a grain, a seed, a stem, a flower, a fruit.

6. The method as claimed in claim 1, characterized in that said plant elements form part of the group comprising cereals, coffee, cocoa, plant grains, plant seeds, mixtures of varieties or of species.

7. The method as claimed in claim 1, characterized in that said characteristic forms part of the group containing a value or a range of values of a composition of a plant element, or a variety of a plant element.

8. The method as claimed in claim 1, characterized in that said characteristic sample value is obtained based on a method forming part of the group comprising, on the one hand, for a compositional characteristic, the Kjeldahl method, the Dumas method or the near infra-red spectroscopy method or the "falling number" for the Hagberg falling number, and, on the other hand, for a variety characteristic, determining the predominant variety of the sample.

9. The method as claimed in claim 1, characterized in that said measured characteristic forms part of a group containing the measurement of the protein content, the Hagberg falling number, the level of myxotoxins (deoxynivalenol, zearalenone, ochratoxine), the moisture content, the specific weight or a level of impurities.

10. The method as claimed in claim 9, characterized in that said measurements use ELISA kits or strip kits for measuring mycotoxins or a moisture meter (piezoelectric or infrared) for measuring moisture or a visual analysis for measuring the level of impurity or the "falling number" for the Hagberg falling number.

11. The method as claimed in claim 1, characterized in that said indicator for inclusion in said at least two classes forms part of the group comprising the indication of one from among said at least two classes or a probability of inclusion in either one of said at least two classes.

12. The method as claimed in claim 1, further comprising the steps involving recording a new sample photograph of a new sample made up of a new mixture of plant elements with an unknown characteristic, obtaining, by means of image analysis software, a new image of an isolated plant element contained in said new sample photograph, and a new corresponding image matrix, said calculator calculating an indicator of inclusion in said at least two classes for said new image matrix.

\* \* \* \* \*